United States Patent
Termini et al.

(10) Patent No.: US 10,314,284 B2
(45) Date of Patent: Jun. 11, 2019

(54) METABOLIC CAGE LINER

(71) Applicant: City of Hope, Duarte, CA (US)

(72) Inventors: John Termini, Duarte, CA (US);
Timothy R. O'Connor, Duarte, CA (US); Miro Rusnak, Duarte, CA (US);
Yin S. Chan, Duarte, CA (US)

(73) Assignee: City of Hope, Duarte, CA (US)

( * ) Notice: Subject to any disclaimer, the term of this patent is extended or adjusted under 35 U.S.C. 154(b) by 197 days.

(21) Appl. No.: 15/132,902

(22) Filed: Apr. 19, 2016

(65) Prior Publication Data

US 2016/0309677 A1 Oct. 27, 2016

Related U.S. Application Data

(60) Provisional application No. 62/152,259, filed on Apr. 24, 2015.

(51) Int. Cl.
| | | |
|---|---|---|
| *A01K 1/015* | (2006.01) | |
| *A01K 29/00* | (2006.01) | |
| *A01K 1/03* | (2006.01) | |

(52) U.S. Cl.
CPC .......... *A01K 1/0157* (2013.01); *A01K 1/0151* (2013.01); *A01K 1/031* (2013.01); *A01K 29/005* (2013.01)

(58) Field of Classification Search
CPC .... A01K 1/0157; A01K 1/015; A01K 1/0151; A01K 1/031; A01K 1/0114; A47K 3/003
See application file for complete search history.

(56) References Cited

U.S. PATENT DOCUMENTS

| | | | | | |
|---|---|---|---|---|---|
| 204,655 | A | * | 6/1878 | Clark | A01K 1/0151 119/528 |
| 454,745 | A | * | 6/1891 | Lee | A01K 1/015 119/527 |
| 2,684,051 | A | * | 7/1954 | Leblond | A01K 1/031 119/417 |
| 3,063,413 | A | * | 11/1962 | Fuller | A01K 1/031 119/174 |
| 3,227,139 | A | * | 1/1966 | Gass | A01K 1/031 119/417 |
| 3,326,186 | A | * | 6/1967 | Doll | B65D 85/50 119/490 |
| 3,397,676 | A | * | 8/1968 | Barney | A01K 1/031 119/417 |
| 3,641,983 | A | * | 2/1972 | Keen | A01K 31/007 119/480 |
| 3,726,255 | A | * | 4/1973 | Marr | A01K 1/0157 119/480 |
| 3,990,398 | A | * | 11/1976 | Davis, Jr. | A01K 1/031 119/480 |

(Continued)

FOREIGN PATENT DOCUMENTS

| | | | | |
|---|---|---|---|---|
| DE | 2127369 A1 | * | 12/1972 | A01K 1/031 |
| FR | 1222416 A | * | 6/1960 | A01K 1/031 |

*Primary Examiner* — Magdalena Topolski
(74) *Attorney, Agent, or Firm* — Mintz Levin Cohn Ferris Glovsky and Popeo, P.C.

(57) ABSTRACT

A liner or pad is configured to be positioned on a bottom surface of a metabolic cage or to form a bottom of a metabolic cage so as to provide a surface that comfortably supports a confined animal in the cage. The pad provides a surface that prevents the mouse from directly contacting the wire mesh bottom of the cage.

6 Claims, 8 Drawing Sheets

(56) References Cited

U.S. PATENT DOCUMENTS

| | | | | |
|---|---|---|---|---|
| 4,250,834 | A | * | 2/1981 | Cheselka ............. A01K 1/0107 119/169 |
| 4,387,666 | A | * | 6/1983 | Thye-Lokenberg ......................... A01K 1/0151 119/530 |
| 4,468,910 | A | * | 9/1984 | Morrison ............. A01K 1/0157 404/36 |
| 4,520,759 | A | * | 6/1985 | Deters ....................... B28B 7/08 119/447 |
| 4,648,351 | A | * | 3/1987 | Lanner ................. A01K 1/0356 119/472 |
| 4,917,046 | A | * | 4/1990 | Spengler ................ A01K 1/031 119/420 |
| D383,253 | S | * | 9/1997 | Semenuk ..................... D30/120 |
| 8,033,249 | B1 | * | 10/2011 | Cook ................... A01K 1/0157 119/165 |
| 8,561,574 | B2 | * | 10/2013 | Tchekneva ............. A01K 1/031 119/417 |
| 2004/0255870 | A1 | * | 12/2004 | McGregor ........... A01K 1/0151 119/528 |
| 2008/0196672 | A1 | * | 8/2008 | Mokhtarian ......... A01K 29/005 119/421 |
| 2008/0314328 | A1 | * | 12/2008 | Johnson ............... A01K 1/0114 119/166 |
| 2009/0269517 | A1 | * | 10/2009 | Karmie ..................... B08B 3/04 428/17 |
| 2010/0242849 | A1 | * | 9/2010 | Newton ............... A01K 1/0107 119/172 |
| 2014/0109838 | A1 | * | 4/2014 | Gabriel ................. A01K 1/031 119/417 |
| 2014/0196666 | A1 | * | 7/2014 | Kuzniar ............... A01K 1/0107 119/479 |
| 2017/0099802 | A1 | * | 4/2017 | Wendling ............. A01K 1/0157 |

\* cited by examiner

METABOLIC CAGE LINER

REFERENCE TO PRIORITY DOCUMENT

This application claims priority to U.S. Provisional Patent Application Ser. No. 62/152,259 entitled "Metabolic Cage Liner" and filed on Apr. 24, 2015. Priority to the aforementioned filing date is claimed and the provisional patent application is incorporated herein by reference in its entirety.

BACKGROUND

In a vivarium setting, small animals, such as mice, are typically confined in a metabolic cage with food and water for periods of time that can be up to 24 hours or longer. Confinement of the animal in the cage facilitates a prolonged study of the animal including collection of urine and feces for chemical and immunological analysis.

When confined in the cage, the animal walks or rests upon the cage's bottom surface, which is formed of interlinked wires separated by gaps to form a wire mesh. The wire mesh is quite uncomfortable and even painful for an animal to rest upon and/or walk upon for an extended period of time. The wire grid does not provide proper support for the animal's feet and the gaps between the wires is often large so that the animal can slip, as described and shown in more detail below.

This uncomfortable environment can negatively stress the animal. This can adversely affect the data collected during the animal's confinement and can cast doubt on data that results from the animal's confinement. Mice confined in metabolic cages display elevated levels of oxidative stress, hyperthermia and muscle catabolism. This is the case for all mice, because of their size and difficulty to navigate on the metal gridwork. However, mice that are severely obese, as is often the case in metabolic studies of diabetic mice have even more problems. The confinement of these obese animals in a metabolic cage to collect urine samples is especially painful as the large girth of the mice causes them to experience high levels of chafing and irritation from the wire mesh on the bottom of the cage.

SUMMARY

In view of the foregoing, there is a need for improved bottom surfaces for an animal to walk upon in a metabolic cage. Disclosed herein is a liner or pad that is configured to be positioned on a bottom surface of a metabolic cage or to form a bottom of a metabolic cage to provide a surface that comfortably supports a confined animal in the cage. The pad is described herein in an example context of being used for a mouse confined in the cage, although it should be appreciated that this disclosure is not limited to use with mice but can be used with other small animals. The pad provides a surface that prevents the mouse from directly contacting the wire mesh bottom of the cage. The pad has a plurality of openings or passageways that provide for free passage of waste, such as urine and feces, into a collection vessel positioned below the bottom surface of the cage. The pad is advantageously made of a nonabrasive or soft material, such as plastic or rubber, that does not irritate the feet or undercarriage of a mouse confined in a cage. The material is configured to be autoclaved, reusable and also hydrophobic. In an alternate, single-use embodiment, the pad can be made of a disposable material. In addition, the material of the pad is not conducive to being eaten or chewed by a mouse confined in the cage.

In one aspect, there is disclosed a device for providing a support surface for an animal in a metabolic cage, comprising: a pad sized and shaped to be positioned on a bottom of a metabolic cage, the pad defining a horizontal surface, wherein a plurality of holes are distributed across the pad so as to form passageways through the pad, and wherein the horizontal surface has sufficient area to fit a foot of a mouse between holes of the pad.

Other features and advantages should be apparent from the following description of various embodiments, which illustrate, by way of example, the principles of the disclosure.

DETAILED DESCRIPTION

Disclosed is a liner or pad that is configured to be positioned on a bottom surface of a metabolic cage or form a bottom of a metabolic cage to provide a surface that comfortably supports a confined animal in the cage. The pad is described herein in an example context of being used for a mouse confined in the cage, although it should be appreciated that this disclosure is not limited to use with mice. The pad provides a surface that prevents the mouse from directly contacting the wire mesh bottom of the cage. The pad has a plurality of openings or passageways that provide for free passage of waste, such as urine and feces, into a collection vessel positioned below the bottom surface of the cage. The pad is advantageously made of a nonabrasive or soft material, such as plastic or rubber, that does not irritate the feet or undercarriage of a mouse confined in a cage. The material is configured to be autoclaved, reusable and also hydrophobic. In an alternate, single-use embodiment, the pad can be made of a disposable material. In addition, the material of the pad is not conducive to being eaten or chewed by a mouse confined in the cage.

Figure 1:
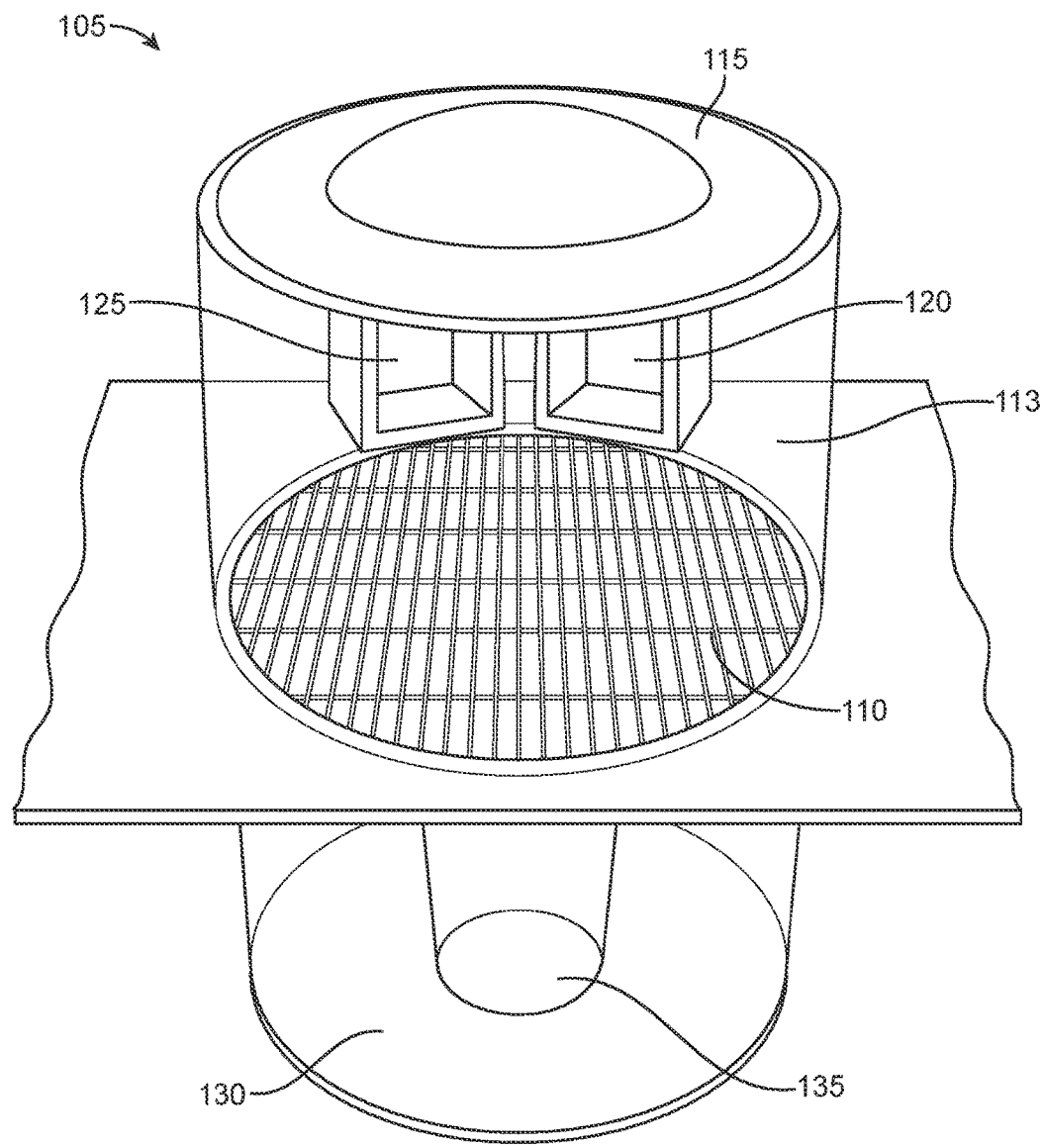
FIG. 1 shows a perspective view of a metabolic cage having a mesh wire bottom surface.

FIG. 1 shows a perspective view of a metabolic container of cage 105 that defines an enclosed volume in which a small animal, such as a mouse, can be confined. The cage 105 has a bottom support region 110 formed of a wire mesh upon which the caged or enclosed mouse can walk or rest. The cage 105 also has one or more sidewalls 113 that enclose a side region of the cage 105. A top wall 115 encloses a top region of the cage and can be removable. The cage 105 has a generally round shaped such that the bottom support region 110 is generally circular. It should be appreciated that the cage 105 can have any of a variety of shapes and that the bottom support region 110 can have any of a variety of shapes as well. In addition, the side and top walls can be formed of solid material or can be formed of wire mesh.

The cage 105 can be equipped with various features that assist in confinement and study of a mouse within the cage.

For example, the cage can include a food supply structure 120 and a water supply structure 125 that can both be accessed by the confined mouse for obtaining food and water. The size and shape of the food supply structure 120 and a water supply structure 125 can vary. In addition, a urine collection structure 130 is positioned below the bottom support region 110 and is configured to receive and transport urine from a mouse in the cage. Likewise, a waste collection structure 135 is also positioned below the bottom support region and is configured to receive solid waste from the mouse. The size and shape of the waste collection structure 135 and urine collection structure 130 can also vary.

Figure 2:
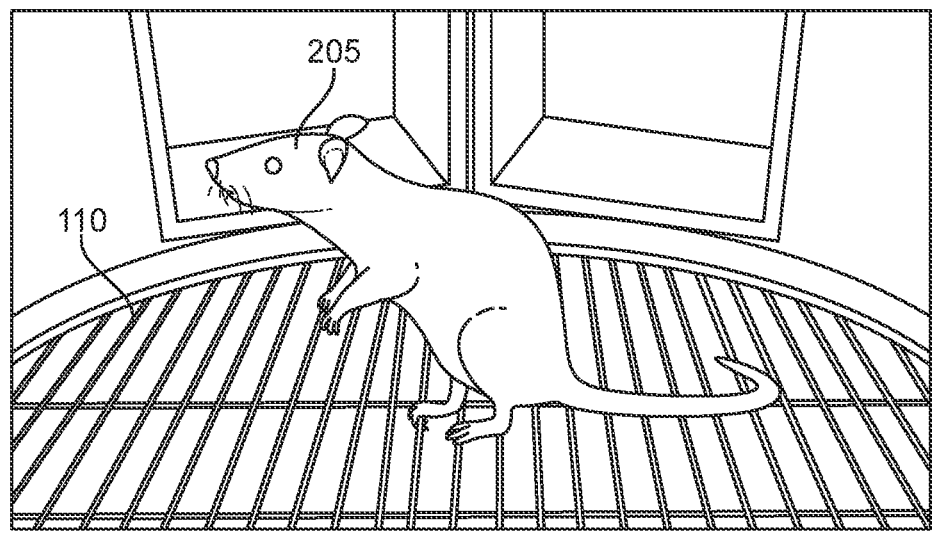
FIGS. 2 and 3 show a mouse standing on a bottom wire surface of a metabolic cage.

Confinement within the cage 105 can be stressful for a mouse. One reason for this is due to loss of body heat resulting from the mouse having direct contact with the metal mesh of the bottom support region 110. The size of the wires that form the mesh in addition to the gaps between the wires (relative to the size and shape of the mouse's feet) can contribute to an inability of the confined mouse to gain secure footing when moving about or simply standing on the bottom support region 110. FIG. 2 shows a mouse 205 positioned on the bottom support region 110 of the cage 105. The mouse is shown positioned on its hind legs while performing a normal task, such as attempting to drink water. The mouse can struggle to stabilize its hind legs as the size of the wires in the bottom of the cage may be too small for the feet of the mouse to find proper support and the slippery nature of the metal surface. Due to the size of the wires relative to the size and shape of the mouse's feet, the mouse may have to stabilize its body using only a single small region of its foot.

Figure 3:
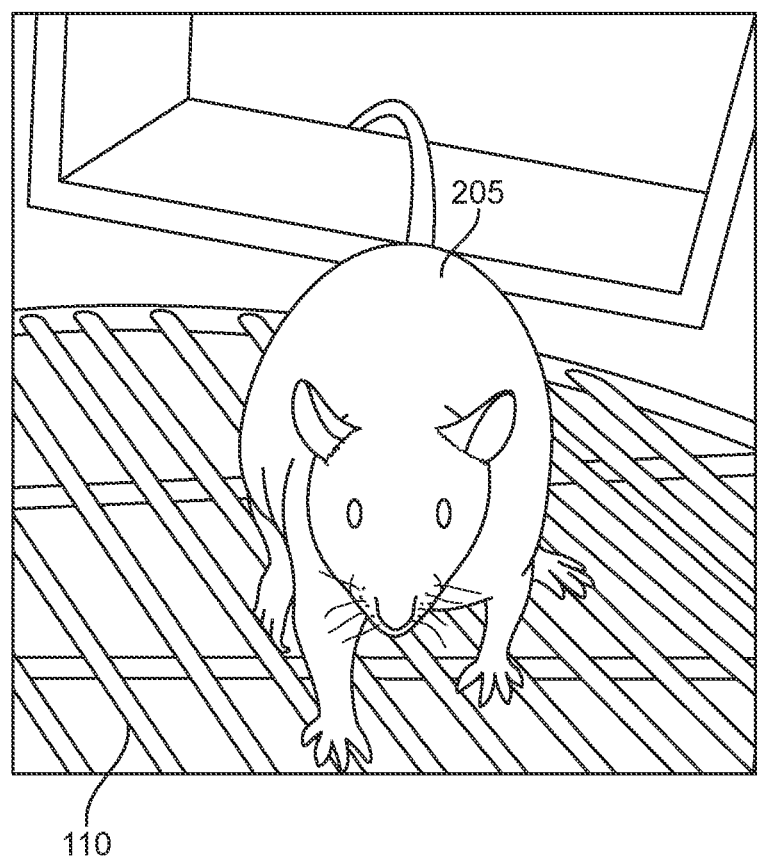

FIG. 3 shows the mouse 205 standing on all four legs on the bottom support region 110. Even when standing on all four legs, the mouse can still experience difficulty in stabilizing its body due to the gaps between the wires and/or the relative size of the wires in relation to the size of the feet of the mouse. The left rear paw of the mouse is only secured on the mesh by a splayed paw.

Figure 4:
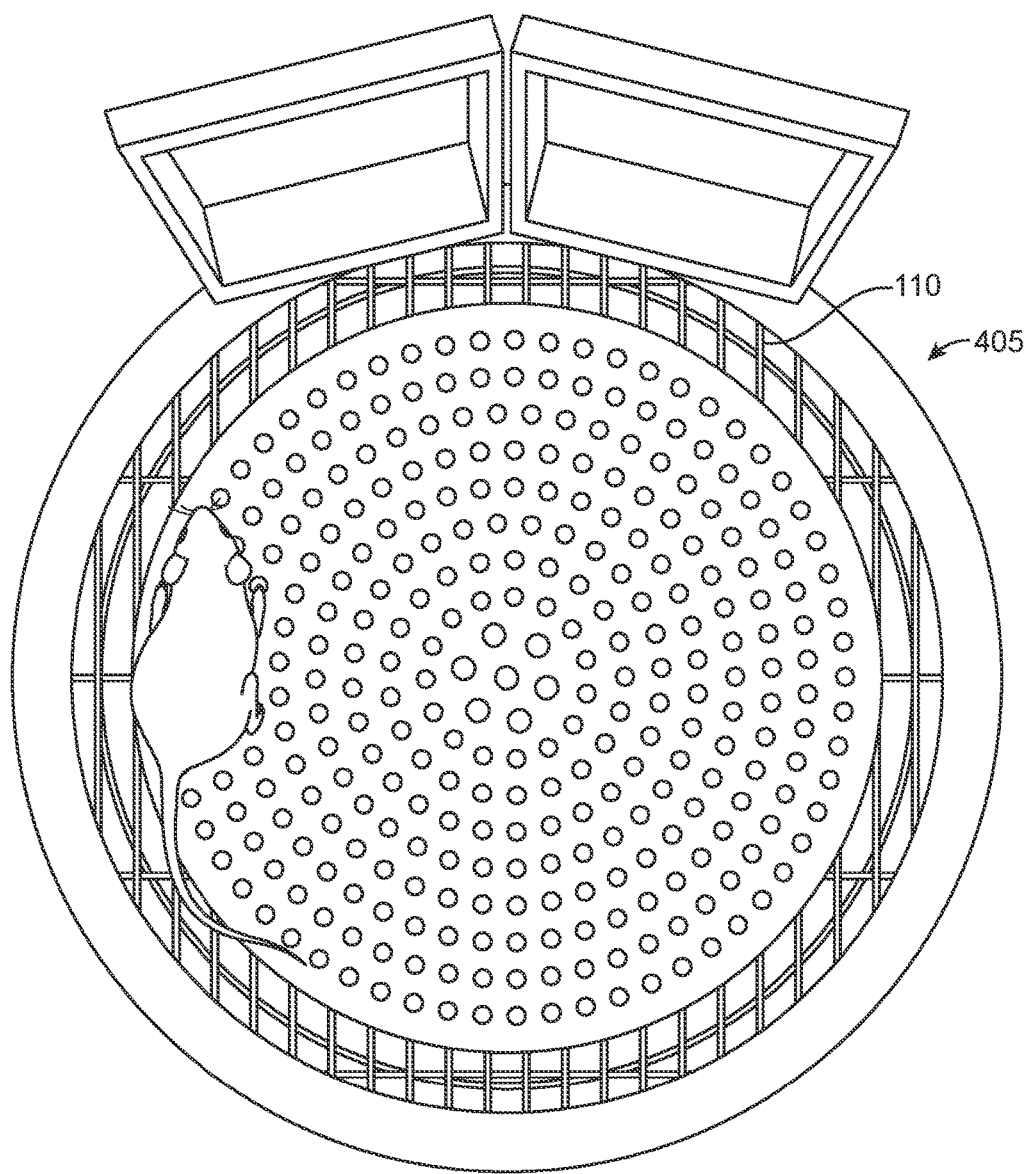
FIG. 4 shows a metabolic cage pad supporting the feet of a mouse in a cage.

FIG. 4 shows a top view of a pad 405 that is sized and shaped to be positioned over the bottom support region 110 of the cage 105 such that the mouse steps on the pad 405 rather than directly on the wires of the bottom support region 110. The pad 405 has a size such that it covers the entire bottom support region 110 or at least a portion of the bottom support region 110. The pad 405 provides a relatively comfortable surface upon which the mouse can walk and rest without irritating the feet or body the mouse.

The pad 405 includes a plurality of holes that are sized and shaped to provide individual or collective passageways through which fluid and solid waste can pass out of the cage and into the waste collection structure 135 in the urine collection structure 130. The holes have a size and shape that is selected such that a remaining surface of the pad 405 provides a proper support surface for the mouse to comfortably stand and rest. That is, the upper surface of the pad between the holes are sized and shaped to provide a comfortable support structure for the mouse's feet. In an embodiment, an uninterrupted upper surface area positioned adjacent a single hole or a plurality of holes has a total surface area that is greater than a surface area of a mouse's foot. In an embodiment, the surface area is so dimensioned relative to the mouse's foot such that the mouse's entire foot can be entirely supported by the surface area.

Figure 5:
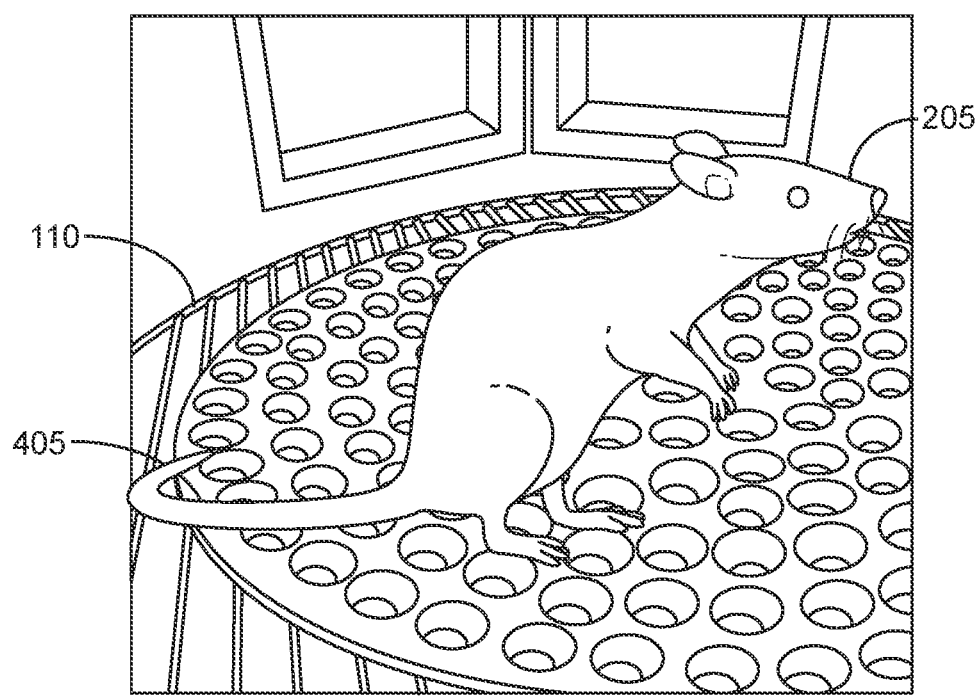
FIG. 5 shows an enlarged view of a mouse standing on a metabolic cage pad.

FIG. 5 shows the mouse 205 standing on his hind legs atop the pad 405. As mentioned, the size, shape, and/or orientation of the holes 410 are selected to provide a comfortable surface for the mouse to stand upon or rest upon while still providing adequate passageway for waste to pass through the pad 405. Thus, there is a balance between the gaps provided by the holes and the remaining support surface of the pad 405. The mouse can be comfortably supported, but there are still sufficient openings in the pad to permit passage of waste.

Figure 6A:
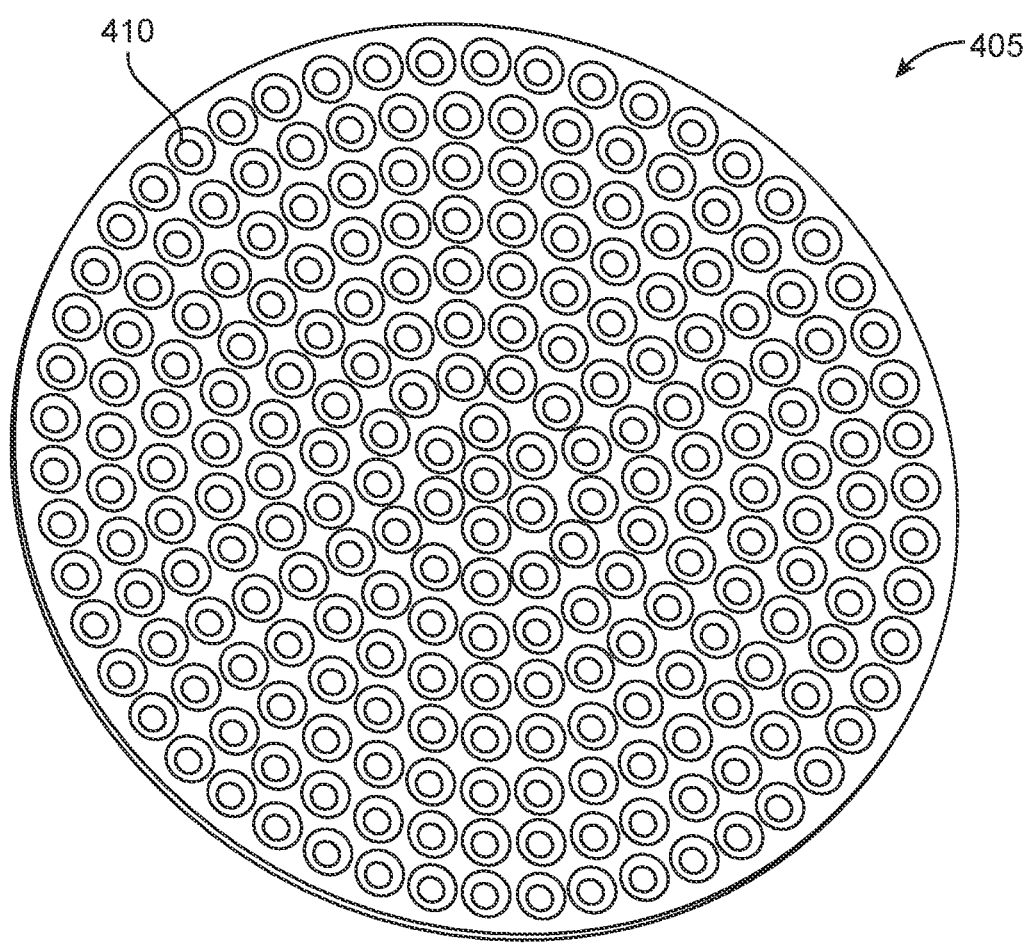
FIG. 6A shows an example embodiment of a top view of a metabolic cage pad.
Figure 6B:
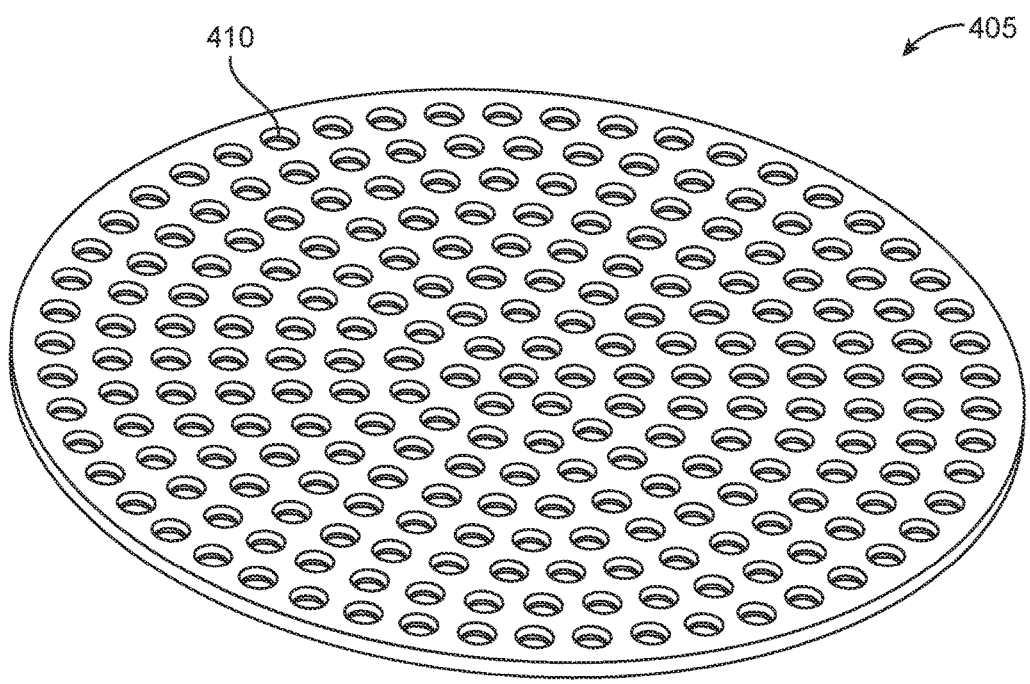
FIG. 6B shows a bottom view of the pad of FIG. 6A.

The holes 410 in the pad 405 have a size, shape, and spatial distribution across the area of the pad 405 that are selected so that the pad provides a sufficient amount of horizontal or partially horizontal surface to support the feet of a mouse on top of the pad. In addition, the holes 410 individually and collectively provide a passageway for waste to pass through the pad. FIG. 6A shows a perspective, top view of an example pad 405. FIG. 6B shows a perspective, bottom view of the example pad 405. The holes are arranged in a pattern with a series of concentric circles such that the holes are evenly distributed across an area of the pad. It should be appreciated that the holes can be arranged in patterns that are different than that shown in FIG. 6.

Figure 7:
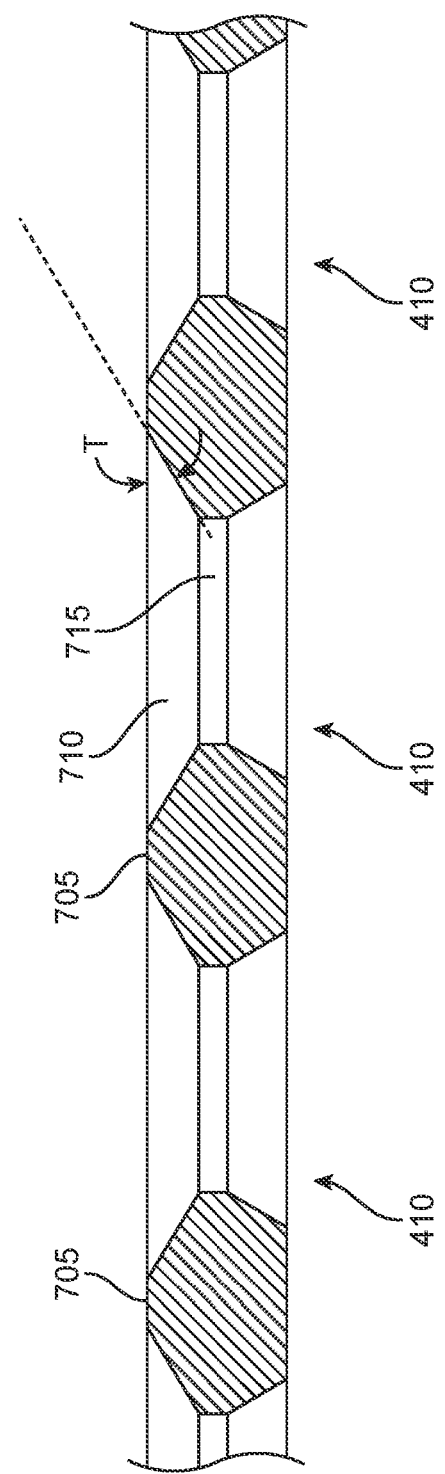
FIG. 7 shows a cross-sectional view of the cage pad.

FIG. 7 shows a cross-sectional view of an example pad 405. The holes 410 are distributed on the pad 405 such that at least a portion of a horizontal wall or surface 705 is positioned between the holes 410. The horizontal surface 705 provides a region for the mouse to walk or rest upon. In an embodiment, the holes are spaced such that the horizontal surface 705 between adjacent holes defines an area at least as large as a foot of a mouse.

Each of the holes 410 is defined by a chamfered surface 710 such that the diameter of each hole 410 is widest at the horizontal surface 705 of the pad 405 and gradually narrows down to a smaller circumference at the center thickness of the pad 405. Moving downward, each hole 410 may also widen to form a chamfered lower surface. The chamfered surface 710 may be defined by an angle T between a chamfered surface and the horizontal top surface of the pad (or bottom surface in the case of a bottom chamfer). In this manner, the distribution of the holes 410 across the pad 405 provides alternating regions of the horizontal surfaces 705 and the chamfered surfaces 710. The horizontal surfaces 705 and chamfered surfaces 710 collectively provide a comfortable surface for the mouse to walk upon and also for the mouse to lodge against when standing.

The value of the diameter of each hole 410 can vary. In addition, the holes 410 do not necessarily all have the same diameter in a pad 405. As mentioned, the chamfered surface 710 can be defined by an angle T between the chamfered surface 710 and the horizontal top surface of the pad. In an embodiment, the angle T is in the range of 30° to 45° although this may vary. In addition, the angle may vary based upon the thickness of the pad such that the chamfered surface 710 has a sufficient horizontal component to support the weight of the mouse. In an example embodiment, the hole is 5 mm at the top surface of the pad with a chamfer of 30° that extends 1.2 mm deep into the thickness of the pad. Moving downward through a hole 410 in FIG. 7, the hole 410 may form a uniform diameter region or waist 715. The thickness of the waist 715 can vary and is 1.2 mm in an embodiment to provide the pad with a total thickness of 2.4 mm including the upper chamfer, lower chamfer, and intermediate waist. In another example embodiment, the waist is 0.5 mm. The pad can vary in total thickness and can be thicker (such as in the range of 5 mm to 6 mm) for a more durable pad. In an embodiment, the thickness of the pad is 2 mm to 6 mm.

In addition, a bottom region of each hole may also be chamfered defined by an angle between the chamfered bottom surface and the horizontal bottom surface of the pad.

The bottom chamfer can vary in structure. In embodiment, the bottom chamfer is a 60° chamfer although this value may vary.

In an embodiment, the pad 405 has holes that are 6 mm in diameter with a 2.5 mm chamfer. In another embodiment, the pad has holes with a 30 degree chamfer on one side and a 60 degree chamfer on an opposite side. In yet another embodiment, the holes have a 45 degree chamfer. The diameter of the holes can vary and can be, for example, 2 mm, 3 mm, 4 mm, 5 mm or 6 mm with any of the chamfers recited herein or other chamfers.

In a method of use, a user gains access to a metabolic cage, such as the metabolic cage shown in FIG. 1. The user then places a pad 405 on a bottom region of the cage such that the pad 405 provides a support surface that will support the weight of a mouse or other animal to be confined in the metabolic cage. The user then positions the mouse in the metabolic cage such that the pad 405 supports the mouse over an extended period of time such as 24 hours.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Although embodiments of various methods and devices are described herein in detail with reference to certain versions, it should be appreciated that other versions, embodiments, methods of use, and combinations thereof are also possible. Therefore the spirit and scope of the appended claims should not be limited to the description of the embodiments contained herein.

The invention claimed is:

1. A system for providing a support surface for an animal in a metabolic cage, comprising:
   the metabolic cage, wherein the metabolic cage has a bottom support region formed of a wire mesh that defines a plurality of openings;
   a pad sized and shaped to be removably positioned atop the bottom support region of the metabolic cage, the pad defining an upper horizontal surface and a lower horizontal surface, wherein a plurality of holes are distributed across the pad so as to form passageways through the pad, and wherein the upper horizontal surface has sufficient area to fit a foot of a mouse between holes of the pad;
   wherein the openings of the plurality of openings of the bottom support region of the metabolic cage have a first shape, and wherein the holes of the plurality of holes of the pad have a second shape, and wherein the first shape is different form the second shape;
   wherein each hole is defined by an upper chamfered surface extending downwardly from the upper horizontal surface of the pad such that a diameter of each hole narrows moving downward through the hole in the region of the upper chamfered surface, and further defined by a lower chamfered surface extending downwardly toward the lower horizontal surface such that a diameter of each hole widens moving downward through the hole in the region of the lower chamfered surface, each hole further being defined by a waist between the upper chamfered surface and the lowered chamfered surface such that the waist defines a region of uniform diameter moving downward through the hole between the upper chamfered surface and the lowered chamfered surface.

2. The system of claim 1, wherein the pad is circular.

3. The system of claim 2, wherein at least one of the holes of the plurality of holes on the pad has a diameter of 5 mm at the upper horizontal surface.

4. The system of claim 1, wherein the upper chamfered surface is defined by a first angle in a range of 30° to 45° relative to the upper horizontal surface of the pad, and wherein the lower chamfered surface is defined by a second angle relative to the lower horizontal surface of the pad, wherein the second angle is different than the first angle.

5. The system of claim 1, where the pad has a thickness of 2 mm to 6 mm.

6. The system of claim 1, wherein the plurality of holes are arranged in a pattern of concentric circles across the pad.

* * * * *

UNITED STATES PATENT AND TRADEMARK OFFICE
CERTIFICATE OF CORRECTION

| | |
|---|---|
| PATENT NO. | : 10,314,284 B2 |
| APPLICATION NO. | : 15/132902 |
| DATED | : June 11, 2019 |
| INVENTOR(S) | : John Termini et al. |

It is certified that error appears in the above-identified patent and that said Letters Patent is hereby corrected as shown below:

In the Specification

At Column 1, Line 10, before the "BACKGROUND", please insert the following paragraph:
--STATEMENT AS TO RIGHTS TO INVENTIONS MADE UNDER FEDERALLY SPONSORED RESEARCH AND DEVELOPMENT
This invention was made with government support under R01 CA176611 awarded by the National Institutes of Health. The government has certain rights in the invention.--

Signed and Sealed this
Seventeenth Day of October, 2023

Katherine Kelly Vidal
*Director of the United States Patent and Trademark Office*